May 22, 1928.  1,670,660
J. HAASE ET AL
AIR CLEANER
Filed June 27, 1927
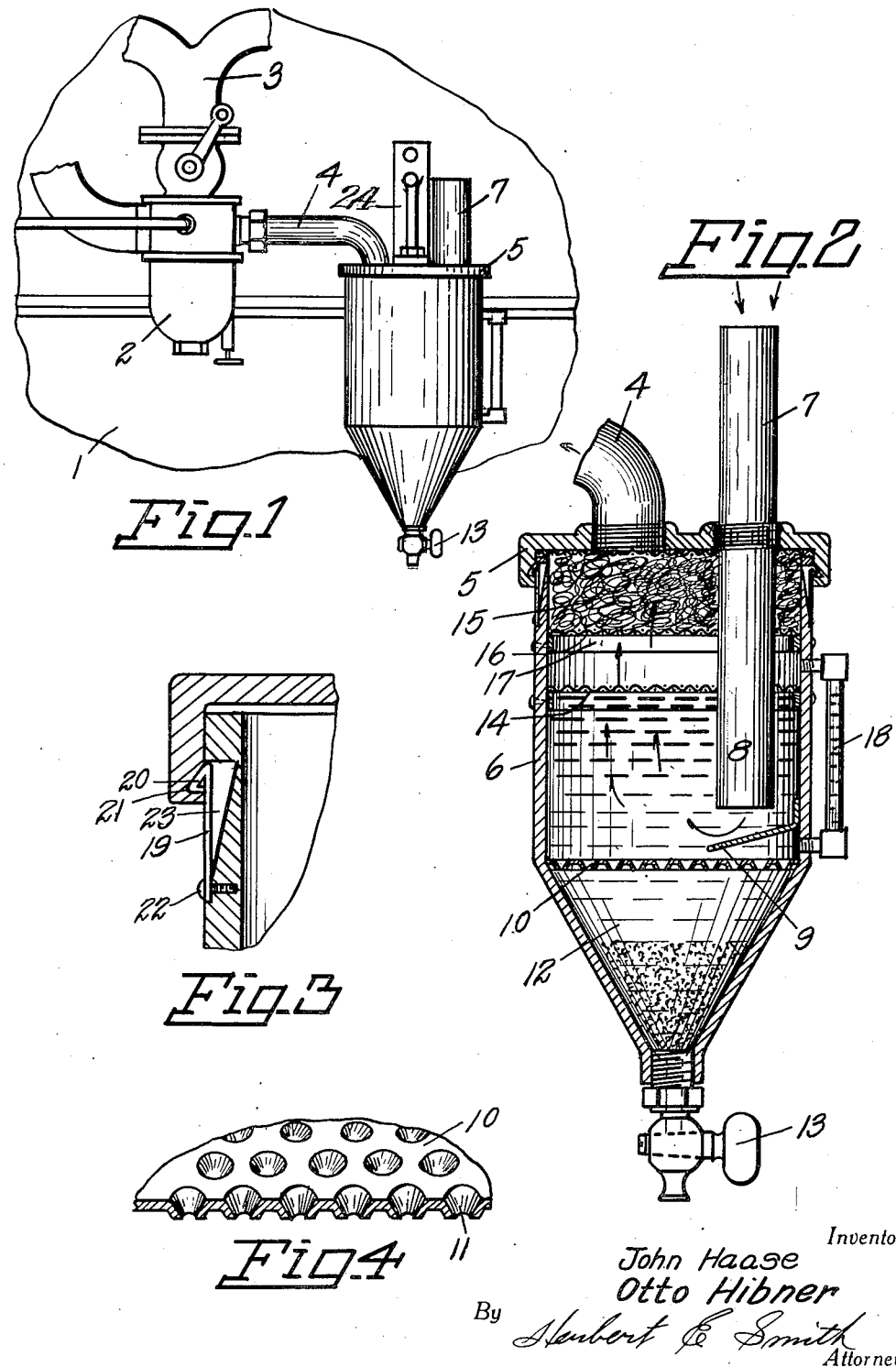
Inventor
John Haase
Otto Hibner
By Herbert E. Smith
Attorney Patented May 22, 1928.

1,670,660

UNITED STATES PATENT OFFICE.

JOHN HAASE AND OTTO HIBNER, OF RITZVILLE, WASHINGTON, ASSIGNORS TO JACOB HAASE, OF RITZVILLE, WASHINGTON.

AIR CLEANER.

Application filed June 27, 1927. Serial No. 201,595.

Our present invention relates to an improved air filter designed for use with the carbureter of internal combustion engines as generally used on automotive vehicles.

The invention involves the use of a casing or tank with water therein as a filtering medium and the invention also utilizes a fibrous packing, as wool, as an auxiliary filter and drier, for the fuel air as it is drawn from the atmosphere.

The invention consists in certain novel combinations and arrangement of parts involving the above indicated structures as will hereinafter be more fully set forth and claimed. In the accompanying drawings we have illustrated one complete example of the physical embodiment of our invention wherein we have illustrated the parts combined and arranged according to the best mode we have thus far devised for the practical application of the principles of our invention.

Figure 1 is a view showing so much of an internal combustion engine, its carbureter, and other parts as are necessary to illustrate the relation thereto of the air filter of our invention.

Figure 2 is an enlarged vertical sectional view of the filter.

Figure 3 is a detail sectional view showing one of the fasteners between the lid or cover and the tank or casing of the filter.

Figure 4 is a detail sectional and partial perspective view of a portion of the perforated partition of the filter tank.

In order that the general arrangement and relation of parts may readily be understood we have illustrated in Figure 1 a portion of an internal combustion 1 with the standard type of carbureter 2, the intake manifold 3 and the air pipe 4. The air pipe 4 is for supplying the filtered air to the carbureter for mixture with the gas as it passes from the carbureter to the intake manifold, and this pipe, as best seen in Figure 2 is threaded into an opening in the lid or cover 5 of the water casing 6 of the filter. Air is supplied from the atmosphere to the filter through the supply pipe 7 and this pipe, which is also secured in the lid 5 terminates at its lower end 8 within the filter body and is submerged below the water level in the fiilter. A baffle plate 9 is located below the lower end of the inlet pipe to direct the incoming water and prevent it from passing in currents through the perforated partition 10. This partition is located at the bottom of the cylindrical part 6 of the filter and is provided with perforations having tapering walls as 11 with the lower walls of the orifices or perforations of smaller diameter than the upper openings. The perforated partition is located between the cylindrical body of the filter and its conical sediment collector or collecting chamber 12. The chamber 12 is adapted to collect sediment from the water entering the filter and the baffle plate 9 and perforated partition 10 prevent agitation by water currents of this sediment. The perforated partition thus acts as a separator for purifying the water and air, and the latter is so directed that it passes only through the purified water for filtering purposes.

The collecting chamber 12 may be emptied and cleansed by the use of the drain cock 13 located at the pointed lower end of the filter.

A reticulated disk 14 is located within the filter at or about the water level to prevent splashing of the water and the filter body is filled to approximately the water level indicated in Figure 2 through the air inlet pipe 7 when required.

In the upper or top part of the filter, above the water level, we supply a fibrous filtering medium for the air as it emerges from the water (as indicated by the arrows in Figure 2) and this medium indicated by the numeral 15 may be wool or other suitable material that not only filters the air, but also acts as a drier and retards movement of moisture to the filtered air pipe 4.

The filtering fibrous material 15 is supported on an open screen as 16 which rests at its edges upon a retaining or supporting ring 17 that is secured to the inner face of the filter, above the water line. A water gage 18 of usual type is used on the exterior of the filter to indicate the water level.

Preferably the lid 5 is rigid with the carbureter through the filtered air pipe 4, and the filter is detachable from the lid for cleansing, repair, or replacement of parts. By means of a suitable number of spring catches or latches 19 each having a hook 20 to engage a keeper-notch 21 in the lid, the body is suspended or supported from the lid. The spring latches are secured at 22 to the exterior of the filter body and the latter is recessed as at 23 to accommodate the latches when the latter are pressed inwardly from engagement with the lid-notch 21 for detaching the filter from the lid.

If desired the lid may be provided with a bracket 24 that is rigidly secured to a stationary support and the bracket adds to the stability of the supported filter.

It will be apparent that as the air passes through the water and thence through the fibrous filtering medium and drier on its way to the filtered air pipe 4 and the carbureter, all extraneous matter is removed from the air and the latter in a filtered or purified state is supplied to the fuel of the engine or motor.

Having thus fully described our invention what we claim as new and desire to secure by Letters Patent is:—

In an air filter the combination with a lid having a fixed-air pipe and an air-supply pipe, of a water container and means for detachably securing said container to the lid, a baffle plate in the water chamber below the lower end of the submerged air supply pipe, a perforated partition in the water container below the baffle and a sediment chamber below the partition, an anti-splash screen at the water level, a fibrous packing in the upper end of the container above the water level and a reticulated support for said packing.

In testimony whereof we affix our signatures.

JOHN HAASE.
OTTO HIBNER.